(12) United States Patent
Parthasarathy

(10) Patent No.: US 12,062,841 B2
(45) Date of Patent: Aug. 13, 2024

(54) TRANSMIT-RECEIVE PORT FOR HALF-DUPLEX TRANSCEIVERS

(71) Applicant: TEXAS INSTRUMENTS INCORPORATED, Dallas, TX (US)

(72) Inventor: Harikrishna Parthasarathy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 9 days.

(21) Appl. No.: 17/487,023

(22) Filed: Sep. 28, 2021

(65) Prior Publication Data

US 2022/0013890 A1 Jan. 13, 2022

Related U.S. Application Data

(63) Continuation of application No. 16/428,471, filed on May 31, 2019, now Pat. No. 11,158,936.

(51) Int. Cl.
*H01Q 1/36* (2006.01)
*H01F 27/30* (2006.01)
*H04B 1/40* (2015.01)

(52) U.S. Cl.
CPC ............... *H01Q 1/36* (2013.01); *H01F 27/30* (2013.01); *H04B 1/40* (2013.01)

(58) Field of Classification Search
None
See application file for complete search history.

(56) References Cited

U.S. PATENT DOCUMENTS

| 2005/0090287 | A1 | 4/2005 | Rofougaran | |
|---|---|---|---|---|
| 2008/0207256 | A1 | 8/2008 | Chan | |
| 2010/0035563 | A1* | 2/2010 | Mikhemar | H04B 1/18 455/78 |
| 2010/0321129 | A1* | 12/2010 | Onody | H03F 1/56 333/124 |
| 2011/0281527 | A1 | 11/2011 | Chiang et al. | |
| 2012/0295556 | A1* | 11/2012 | Chien | H03F 3/45475 330/69 |
| 2014/0015614 | A1 | 1/2014 | Oliveira | |
| 2014/0087673 | A1 | 3/2014 | Mostov et al. | |
| 2014/0199951 | A1 | 7/2014 | Yu | |
| 2014/0266461 | A1* | 9/2014 | Youssef | H03F 3/193 330/295 |
| 2015/0094117 | A1* | 4/2015 | Conta | H03F 3/45179 455/560 |
| 2015/0244410 | A1* | 8/2015 | Leong | H01L 23/66 455/73 |

(Continued)

FOREIGN PATENT DOCUMENTS

| CN | 101483409 A | 7/2009 |
|---|---|---|
| CN | 102185626 A | 9/2011 |

(Continued)

OTHER PUBLICATIONS

PCT International Search Report;POCT/US 2020/035102; mail date: Jul. 9, 2020; 2 pages.

*Primary Examiner* — Crystal L Hammond
(74) *Attorney, Agent, or Firm* — Mandy Barsilai Fernandez; Frank D. Cimino

(57) ABSTRACT

A half-duplex transceiver includes an antenna, antenna-side transformer windings coupled to the antenna, and a low-noise amplifier coupled to the antenna by the antenna-side transformer windings.

23 Claims, 5 Drawing Sheets

600

602 — OPERATING A HALF-DUPLEX TRANSCEIVER IN A RECEIVE MODE BY COUPLING A LOW-NOISE AMPLIFIER TO THE ANTENNA-SIDE TRANSFORMER WINDINGS

604 — OPERATING THE HALF-DUPLEX TRANSCEIVER IN A TRANSMIT MODE BY DE-COUPLING THE LOW-NOISE AMPLIFIER FROM THE ANTENNA-SIDE TRANSFORMER WINDINGS

(56) References Cited

U.S. PATENT DOCUMENTS

| | | | |
|---|---|---|---|
| 2015/0333791 A1 | 11/2015 | Anderson et al. | |
| 2016/0226552 A1 | 8/2016 | Jin et al. | |
| 2017/0019135 A1 | 1/2017 | Kwok | |
| 2017/0077984 A1* | 3/2017 | Esmaeilzadeh Najari | ................. H04B 1/006 |
| 2017/0110792 A1 | 4/2017 | Le Goff | |
| 2017/0250728 A1* | 8/2017 | Afsahi | ................. H04B 1/44 |
| 2019/0081596 A1* | 3/2019 | Dunworth | ............ H01Q 1/2283 |

FOREIGN PATENT DOCUMENTS

| | | | | |
|---|---|---|---|---|
| CN | 102792765 A | | 11/2012 | |
| CN | 103378869 A | | 10/2013 | |
| CN | 104205628 A | * | 12/2014 | ............... H03H 7/09 |
| CN | 104205628 A | | 12/2014 | |
| CN | 105099414 A | | 11/2015 | |
| CN | 209151150 U | | 7/2019 | |
| CN | 209199325 U | | 8/2019 | |
| TW | 201141089 A | | 11/2011 | |

\* cited by examiner

TRANSMIT-RECEIVE PORT FOR HALF-DUPLEX TRANSCEIVERS

CROSS-REFERENCE TO RELATED APPLICATION

This application is a continuation of U.S. patent application Ser. No. 16/428,471, filed on May 3, 2019, which is hereby incorporated herein by reference in its entirety.

BACKGROUND

A number of communication systems including, but not limited to, digital wireless communication systems, wired communication systems, and associated applications utilize half-duplex transceivers for communication purposes. In a typical half-duplex transceiver, data is transmitted and received at different time periods. In certain half-duplex transceivers, various wireless transmission protocols (e.g., 802.11b/g WiFi) combine a transmit port and a receive port (the resultant port being a "Tx-Rx port") on the transceiver in order to free an additional pin. The Tx-Rx port is coupled to an antenna, for example by a bond wire coupling, to transmit and receive wireless signals. During the time periods in which the transceiver is configured to receive wireless signals, such received signals are transmitted from the antenna to an amplifier (e.g., a low-noise amplifier (LNA)) by way of a capacitive coupling on a secondary side of a power amplifier balun transformer. The capacitive coupling serves as part of a matching network between the antenna and the LNA. However, the capacitive coupling increases the noise figure (or the degradation of signal-to-noise ratio (SNR)) and is sensitive to variations in bond wire inductance.

SUMMARY

In accordance with at least one example of the disclosure, a half-duplex transceiver includes an antenna, antenna-side transformer windings coupled to the antenna, and a low-noise amplifier coupled to the antenna by the antenna-side transformer windings.

In accordance with another example of the disclosure, a half-duplex transceiver includes an antenna and antenna-side transformer windings coupled to the antenna. The half-duplex transceiver is configured to operate in a receive mode in which a low-noise amplifier is coupled to the antenna by the antenna-side transformer windings.

In accordance with yet another example of the disclosure, a method of operating a half-duplex transceiver including an antenna coupled to antenna-side transformer windings includes operating the half-duplex transceiver in a receive mode by coupling a low-noise amplifier to the antenna by the antenna-side transformer windings.

BRIEF DESCRIPTION OF THE DRAWINGS

For a detailed description of various examples, reference will now be made to the accompanying drawings in which.

DETAILED DESCRIPTION

In addition to improving noise performance by mitigating the increased noise figure caused by a capacitive coupling between the antenna and the LNA explained above, it is also desirable to reduce power consumption of half-duplex wireless transceivers. Examples of the present disclosure address the foregoing by utilizing an inductor as a coupling between the antenna and the LNA. In examples, the inductor is at least part of the matching network that transforms the impedance of the antenna to an optimum source impedance for the LNA.

The inductor couples to the antenna through the secondary- or antenna-side windings of the power amplifier balun transformer. The inductor is also coupled to the LNA. By replacing the capacitive matching network with an inductive matching network, the noise figure is decreased. For example, and as will be explained further below with respect to FIG. 4, using an inductor as a coupling between the antenna and the LNA results in a source impedance value that intersects a noise circle having a lower value than that which would be available when using a capacitor as the coupling device.

In some examples, the matching network includes components in addition to the inductor coupling the antenna to the LNA, which move the source impedance closer to Gmin (e.g., an optimum source impedance). When using an inductor as a coupling between the antenna and the LNA, the additional components of the matching network are able to add less additional inductance to approximate Gmin than the additional components of a matching network when using a capacitor as a coupling device. Further, loss due to the received signal coupling to the amplifier-side windings of the balun transformer is reduced, which effectively increases the gain of the LNA. As a result, for a similar gain and noise performance, the half-duplex transceiver current consumption is reduced. The half-duplex transceiver is also less sensitive to variations in bond wire inductance because this value is a relatively small percentage of the overall inductance of the matching network, including the inductor as a coupling between the antenna and the LNA, which is explained in further detail below.

Figure 1:
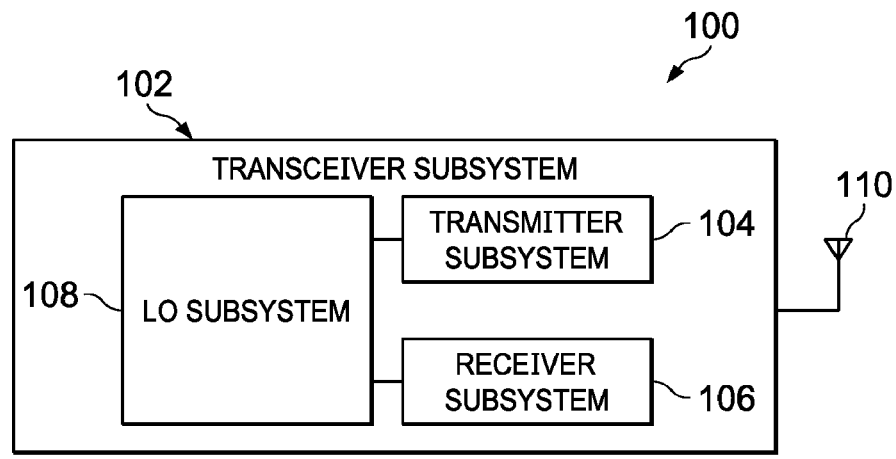
FIG. 1 shows a block diagram of an example communication system in accordance with various examples.

FIG. 1 depicts a block diagram of a communication system 100, where various examples can be implemented. In this broad level representation of FIG. 1, the communication system 100 is shown as a transceiver, designed to transmit and receive signals. Examples of the communication system 100 include, but are not limited to, a subscriber station, a wireless device, a cellular telephone, a cordless telephone, a handheld two-way radio, a Session Initiation Protocol (SIP) phone, a wireless local loop (WLL) station, a personal digital assistant (PDA), a handheld device having wireless connection capability, other processing device connected to a wireless modem fixed telephone systems, mobile computer or media players with communication capabilities, and other communication devices. The communication system 100 includes a transceiver subsystem 102 including a transmitter subsystem 104 and a receiver subsystem 106, and an antenna 110. In an example, the communication system 100 also includes a local oscillator (LO) subsystem 108, which provides a LO signal (or a signal derived from a LO signal) to the transmitter subsystem 104 and the receiver subsystem 106.

In an example, the transceiver subsystem 102 is a half-duplex transceiver that includes the transmitter subsystem 104 for transmitting data and the receiver subsystem 106 for receiving data. Some components of the transmitter subsystem 104 and the receiver subsystem 106 may be a common component. The transmitter subsystem 104 and the receiver subsystem 106 are configured to operate at different time intervals for transmission and reception of data, respectively. For example, during a transmission phase of the transceiver subsystem 102, the transmitter subsystem 104 is in an active state and the receiver subsystem 106 is in an inactive state. During a reception phase of the transceiver subsystem 102, the receiver subsystem 106 is in the active state and the transmitter subsystem 104 is in the inactive state.

Figure 2:
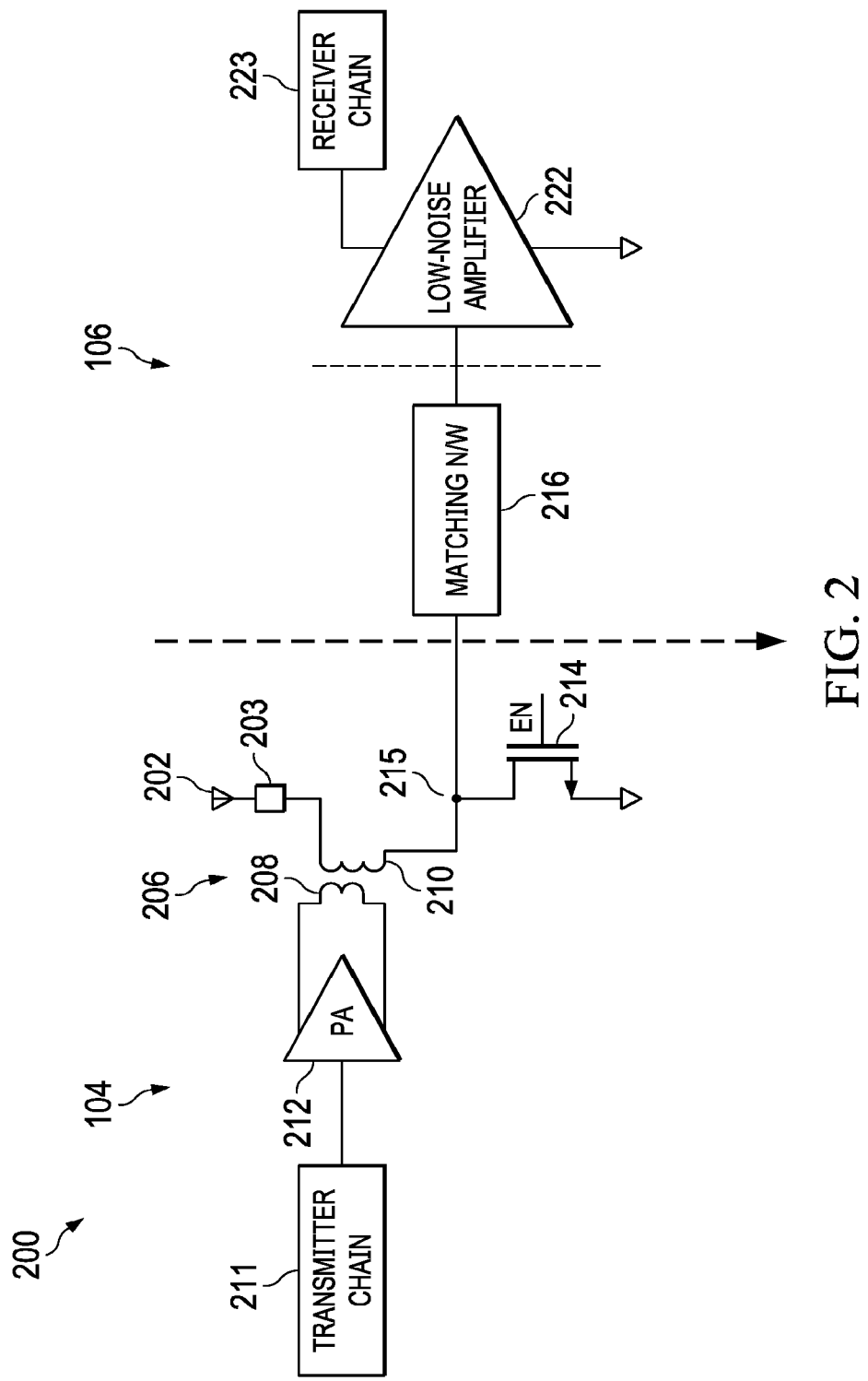
FIG. 2 shows a block diagram of a half-duplex transceiver including circuit schematic elements in accordance with various examples.

FIG. 2 shows a half-duplex transceiver 200 that includes the transmitter subsystem 104 and the receiver subsystem 106 in further detail, with certain circuit elements being depicted. The transmitter subsystem 104 includes a transmitter chain 211 that is coupled to a power amplifier 212. The power amplifier 212 is configured to produce a differential signal that is applied to amplifier-side windings 208 of a balun transformer 206. The balun transformer 206 also includes antenna-side windings 210, which are coupled to an antenna 202. When the power amplifier 212 applies a differential signal to the amplifier-side windings 208, the balun transformer 206 operates to convert the differential signal to a single-ended signal in the antenna-side windings 210, which is then transmitted via the antenna 202.

Figure 3:
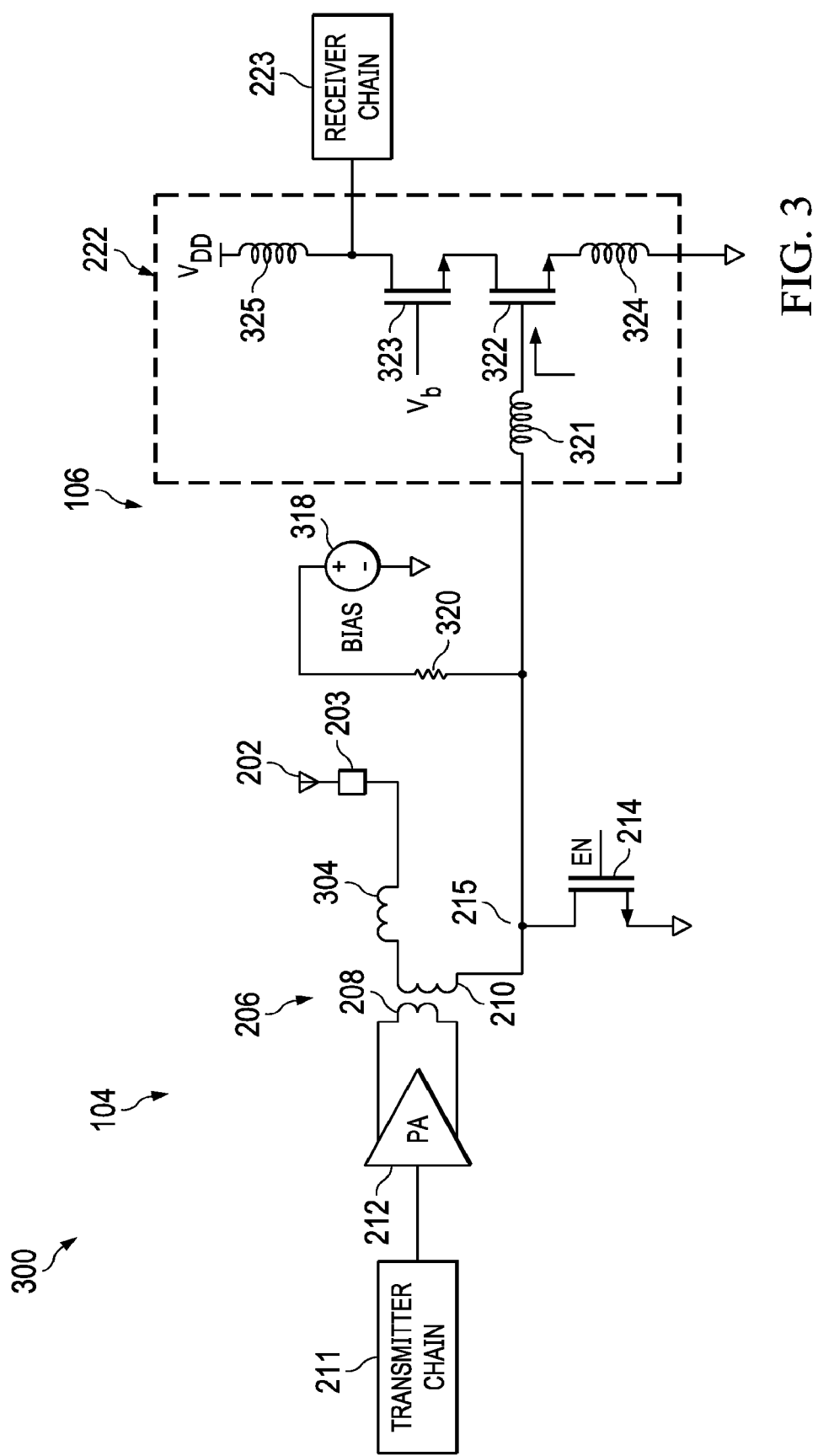
FIG. 3 shows a circuit schematic diagram of a half-duplex transceiver in accordance with various examples.

The receiver subsystem 106 includes a receiver chain 223 that is coupled to a low-noise amplifier (LNA) 222. Examples of this disclosure do not limit the LNA 222 to any particular topology or design; rather, the LNA 222 may include a variety of known topologies, such as common gate or common source with source degeneration, which is shown in FIG. 3. The LNA 222 is coupled to a matching network 216 and amplifies RF signals received from the matching network 216. The LNA 222 and the matching network 216 are referred to separately in FIG. 2 to illustrate the distinction between amplification functionality (e.g., carried out by the LNA 222) and impedance-matching functionality (e.g., carried out by the matching network 216). However, it should be appreciated that certain components (e.g., components such as transistors and inductors, which are described further below with respect to FIG. 3) contribute to both the amplification functionality of the LNA 222 and to impedance-matching functionality of the matching network 216. Thus, although the LNA 222 and the matching network 216 are shown separately in FIG. 2, sub-components of these functional blocks are not necessarily mutually exclusive or distinct.

The matching network 216 is in turn coupled to the antenna-side windings 210. A transmit-receive switch (Tx-Rx switch) 214 is configured to selectively couple a node 215 between the antenna-side windings 210 and the matching network 216 to a ground node. In this example, the Tx-Rx switch 214 is an n-type metal-oxide-semiconductor field-effect transistor (MOSFET). Thus, in an example, when a signal (EN) applied to the gate of the Tx-Rx switch 214 is asserted, the Tx-Rx switch 214 conducts and couples the node 215 to the ground node. Conversely, when the EN signal is de-asserted, the Tx-Rx switch 214 does not conduct and isolates the node 215 from the ground node.

As explained above, various wireless transmission protocols (e.g., 802.11b/g WiFi) combine a transmit port and a receive port (the resultant port being a "Tx-Rx port") on the transceiver in order to free an additional pin. In the example of FIG. 2, the antenna 202 is coupled to such a single Tx-Rx port 203. The examples of this disclosure may be applied to any half-duplex system.

The transmitter subsystem 104 is active during time periods in which the half-duplex transceiver 200 is transmitting. To effect transmission of a signal through the antenna 202, the transmitter chain 211 includes suitable logic, circuitry, and/or executable instructions to enable generation of RF transmit signals. The generated RF transmit signals from the transmitter chain 211 are coupled to the input of the power amplifier 212. The power amplifier 212 contains suitable logic, circuitry, and/or executable instructions to amplify the signal at its input. In an example, the RF transmit signals are transmitted by the antenna 202 at a higher power level than that of an RF signal received at the antenna 202, and thus the power amplifier 212 receives as input the RF transmit signals, amplifies the RF transmit signals, and provides the amplified RF transmit signals to the amplifier-side windings 208 of the balun transformer 206. The amplifier-side windings 208 transfer electrical energy to the antenna-side windings 210 (e.g., by magnetic coupling), which in turn provides the signal to the antenna 202 for wireless transmission.

During time periods in which the half-duplex transceiver 200 is transmitting, the EN signal is asserted and thus the Tx-Rx switch 214 conducts and couples the node 215 to the ground node. The amplitude of the amplified RF transmit signals is large, which could for example damage the LNA 222. To avoid such damage, the Tx-Rx switch 214 sufficiently decouples the antenna-side windings 210 from the matching network 216, and thus the LNA, by providing a connection from the antenna-side windings 210 to the ground node.

During time periods in which the half-duplex transmitter 200 is receiving, the EN signal is de-asserted and thus the Tx-Rx switch 214 does not conduct and isolates the node 215 from the ground node. As a result, the antenna-side windings 210 are coupled to the matching network 216, and in turn to the LNA 222. Thus, the antenna-side windings 210 function as an inductive signal coupling since the antenna 202 is coupled to the LNA 222 by the antenna-side windings 210. RF signals are received at the antenna 202 and transferred through the antenna-side windings 210 and the matching network 216 to the LNA 222. The LNA 222 amplifies the received RF signals, and the amplified received RF signals are provided at the output of the LNA 222 to the receiver chain 223. The receiver chain 223 includes suitable logic, circuitry, and/or executable instructions to enable processing of the received RF signals.

The matching network 216 is configured to transfer the received RF signals from the antenna 202 to the LNA 222 while transforming the impedance of the antenna 202 to an optimum source impedance for the LNA 222. It is desirable to design the matching network 216 so as to reduce the noise factor and current consumption of the receiver subsystem 106. It is further desirable to reduce sensitivity to variations in bond wire inductance. These factors will be discussed in further detail below with respect to FIG. 3.

FIG. 3 shows an example circuit schematic diagram of a half-duplex transceiver 300. Like the half-duplex transceiver 200 of FIG. 2, the half-duplex transceiver 300 also includes the transmitter subsystem 104 and the receiver subsystem 106. In FIG. 3, elements with like numbers to those described with respect to FIG. 2 function in a like manner, including the transmitter chain 211, the power amplifier 212, the balun transformer 206 (and its windings 208, 210), the antenna 202, the Tx-Rx port 203, the Tx-Rx switch 214, the LNA 222, and the receiver chain 223.

The half-duplex transceiver 300 further demonstrates the presence of bond wire inductance, represented by the inductor 304 coupled to the antenna 202 and the antenna-side windings 210 of the balun transformer 206. A bias voltage source 318 and a bias resistor 320 are coupled to the input of the LNA 222 and are configured to provide a direct current (DC) voltage at the input of the LNA 222 to allow for proper amplification of the received RF signals. In this example, the LNA 222 includes a first n-type MOSFET 322 and a second n-type MOSFET 323, each having a gate, a source, and a drain. The source of the first n-type MOSFET 322 is coupled to a source degeneration inductor 324, which is in turn coupled to a ground node. The gate of the first n-type MOSFET 322 is coupled to a gate inductor 321 and functions as the input of the LNA 222, while the drain of the first n-type MOSFET 322 is coupled to the source of the second n-type MOSFET 323. The gate of the second n-type MOSFET 323 is coupled to a voltage source, which is not shown for simplicity but provides a voltage $V_b$ to bias the gate of the second n-type MOSFET 323. The drain of the second n-type MOSFET 323 is coupled to the receiver chain 223 and provides the amplified received RF signals to the receiver chain 223 for additional processing. The drain of the second n-type MOSFET 323 is also coupled to a load inductor 325, which is in turn coupled to a supply voltage node, represented by $V_{DD}$ in this example. As explained above with respect to FIG. 2, the components of the LNA 222 may also contribute to impedance-matching functionality of the receiver subsystem 106. For example, the gate inductor 321 and the source degeneration inductor 324 provide impedance-matching functionality in addition to being part of the LNA 222 topology. Similarly, the n-type MOSFETs 322, 323 also provide impedance-matching functionality in addition to being part of the LNA 222 topology.

The first n-type MOSFET 322 provides a current proportional to its transconductance and quality factor of the matching network 216, which in this example is represented by the gate inductor 321 and the source degeneration inductor 324. This amplified current flows through the second n-type MOSFET 323 and into the load inductor 325, resulting in a voltage gain at Vout relative to the signal voltage at the gate of the n-type MOSFET 322, which is received and processed by the receiver chain 223. Thus, the gain of the LNA 222 is impacted by the quality factor of the matching network 216 (e.g., the gate inductor 321 and the source degeneration inductor 324) and the load inductor 325 as well as the transconductance of the n-type MOSFET 322. As explained above, since the inductance required to be provided by the matching network 216 to achieve Gmin is lower when using the antenna-side windings 210, functioning as an inductor, as a signal coupling element than when using a capacitive coupling element, the gain of the LNA 222 is also improved.

In accordance with an example, signal coupling from the antenna 202 to the LNA 222 is provided by the antenna-side windings 210, functioning as an inductor. In particular, the antenna-side windings 210 are coupled to the input of the LNA 222 (e.g., the gate of the first n-type MOSFET 322 by way of gate inductor 321) and to the antenna 202.

As explained above, a bond wire may be used to couple the antenna 202 to the antenna-side windings 210 of the balun transformer 206. Such a bond wire coupling has an inductance component 304 of its own that may vary as a function of process tolerance, impacting the noise performance of the receiver subsystem 106. However, the sum value of the antenna-side windings 210 and the gate inductor 321 is much greater than the bond wire inductance 304. Thus, by using the antenna-side windings 210 as the signal coupling from the antenna 202 to the input of the LNA 222, variations in bond wire inductance 304 have a lessened impact on noise performance of the receiver subsystem 106. In one example, the antenna-side windings 210 and the inductor 321 may have an inductance of approximately 4 nH, while the bond wire inductance 304 is approximately 1 nH and varies up to +/−10% (0.1 nH) based on the frequency of received RF signals. Thus, the overall inductance in the signal path from the antenna 202 to the LNA 222 varies from approximately 4.9-5.1 nH, which is only a variation of 2%. As a result of the lessened impact of variations in bond wire inductance 304, overall noise performance of the receiver subsystem 106 is improved over a range of variation of bond wire inductance 304.

Figure 4:
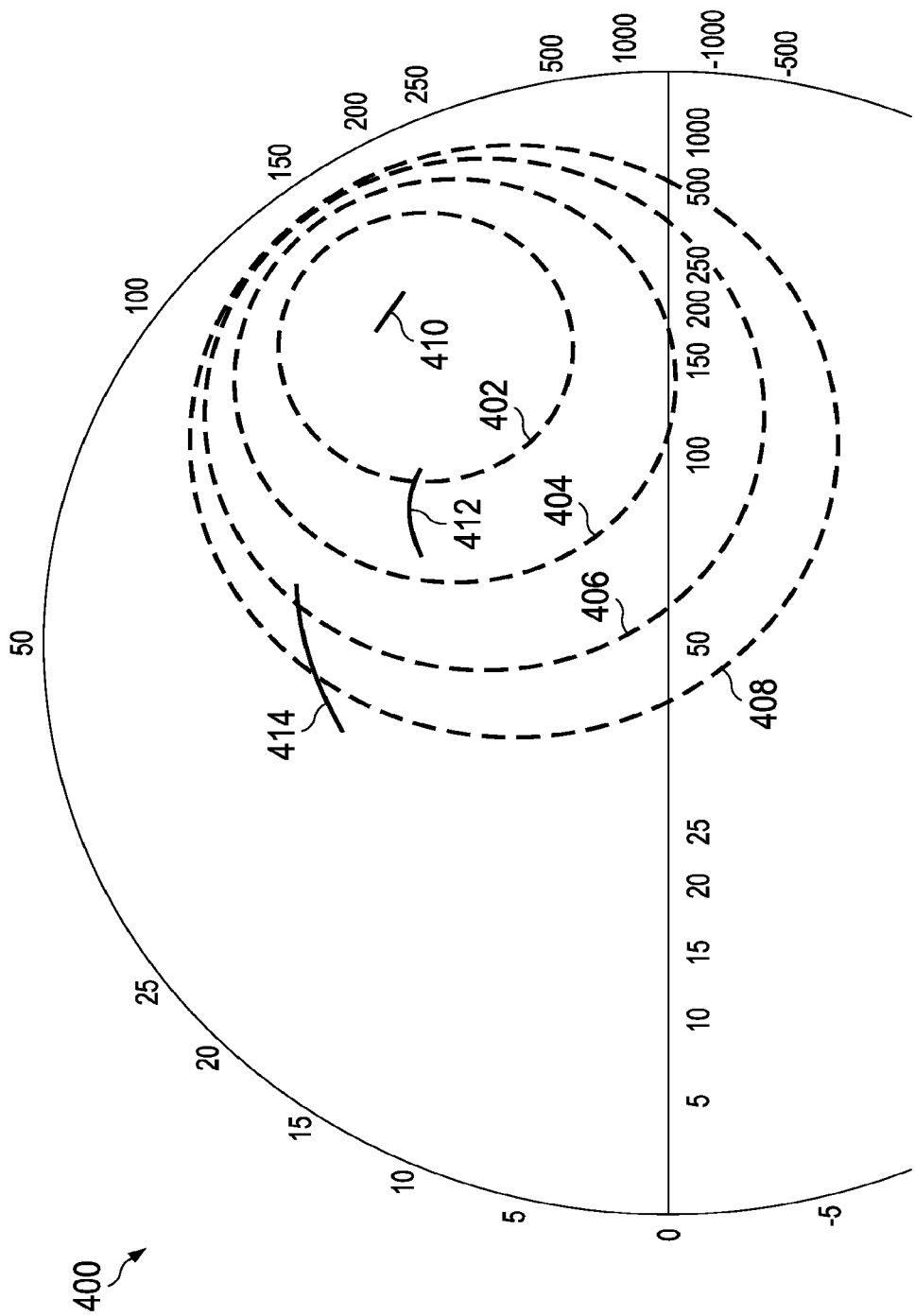
FIG. 4 shows an exemplary Smith chart in accordance with various examples.
Figure 5:
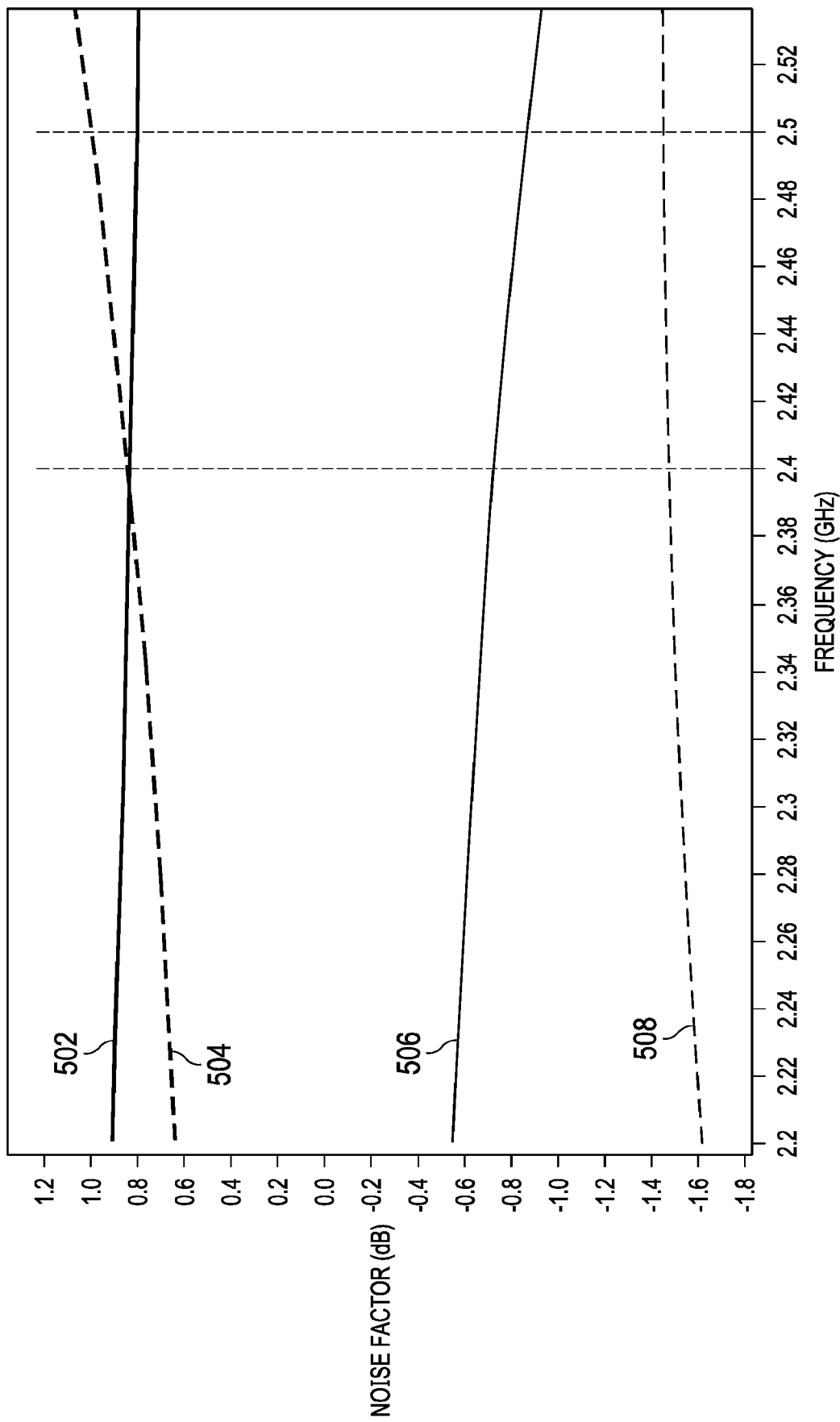
FIG. 5 shows an exemplary graph of noise factor and power loss as a function of frequency in accordance with various examples.

In addition to reducing performance dependencies on the variations in bond wire inductance 304, using the inductor 321 as the signal coupling from the antenna-side windings 210 to the input of the LNA 222 also improves the noise factor of the LNA 222 as well as the current consumption of the receiver subsystem 106, as explained further with respect to FIGS. 4 and 5. FIG. 4 shows a Smith chart 400 having noise figure circles 402, 404, 406, 408 that correspond to LNA 222 noise figures of 2, 2.5, 3, and 3.5 dB, respectively. The Smith chart 400 includes an impedance curve 410 as a function of frequency (e.g., 2.3-2.5 GHz) that corresponds to "Gmin" for the LNA 222. The Smith chart 400 also includes an impedance curve 412 as a function of frequency that corresponds to utilizing the antenna-side windings 210 as the signal coupling between the antenna 202 and the input of the LNA 222. Finally, the Smith chart 400 includes an impedance curve 414 as a function of frequency that corresponds to utilizing a capacitor as the signal coupling between the antenna 202 and the input of the LNA 222.

As can be seen, the impedance curve 412 corresponding to the antenna-side windings 210, functioning as an inductive signal coupling, is approximately 1 dB better than the impedance curve 414 corresponding to the capacitive signal coupling in terms of noise figure. Further, an impedance curve being farther away from the noise figure circle 402, which represents an optimal source impedance for the LNA 222, requires more inductance to rotate the impedance curve into the noise figure circle 402. In examples, increasing inductance in a matching network introduces additional noise to the RF signals that propagate through the matching network. Thus, to achieve the optimal source impedance for the LNA 222, the matching network using the capacitive signal coupling requires more inductance, and introduces more noise, than the matching network using the inductive signal coupling of the antenna-side windings 210.

In addition to the improved noise performance achieved by using the inductive signal coupling of the antenna-side windings 210 between the antenna 202 and the input of the LNA 222, current consumption of the receiver subsystem 106 is also reduced. FIG. 5 shows a set of waveforms 500 that demonstrate the noise factor and power loss as a function of frequency that result from both using a capacitive signal coupling and using inductive signal coupling of the antenna-side windings 210. The waveforms 500 include a waveform 502 that shows noise factor as a function of frequency when using a capacitive signal coupling and a waveform 504 that shows noise factor as a function of frequency for an inductive signal coupling, such as the inductive signal coupling of the antenna-side windings 210 as explained above. The waveforms 500 also include a waveform 506 that shows power loss due to the received signal coupling to the amplifier-side windings 210 of the balun transformer 206 as a function of frequency for an inductive signal coupling, such as the inductive signal coupling of the antenna-side windings 210 as explained above. The waveforms 500 further include a waveform 508 that shows power loss due to the received signal coupling to the amplifier-side windings 210 of the balun transformer 206 as a function of frequency for a capacitive signal coupling.

As shown in FIG. 5, for approximately equivalent noise factor performance at 2.4 GHz (e.g., the intersection of waveforms 502, 504), the power loss for the inductive signal coupling, shown by waveform 506, is less than the power loss for the capacitive signal coupling, shown by waveform 508. Due to the inductive signal coupling providing improved noise performance, as demonstrated in FIG. 4 and explained above, the LNA 222 current consumption (and thus half-duplex transceiver 300 current consumption) is reduced, while still providing comparable noise performance to half-duplex transceivers using a capacitive signal coupling.

Figure 6:
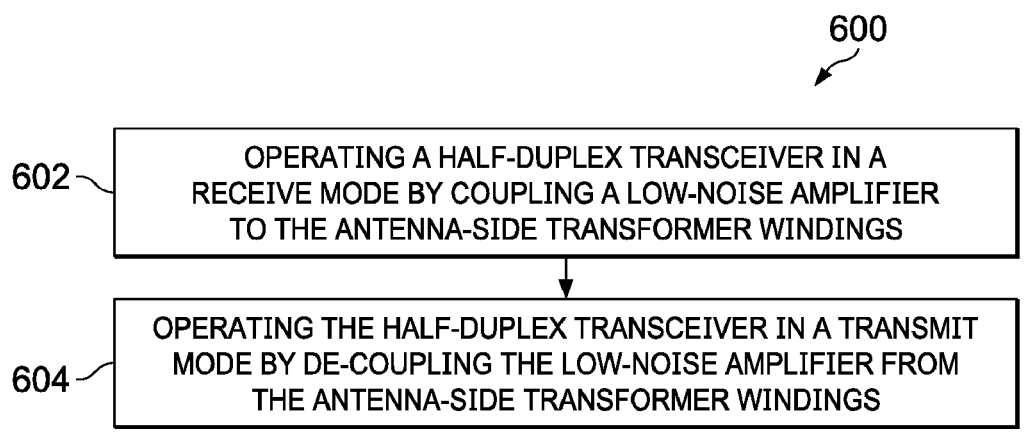
FIG. 6 shows a flow chart of a method for operating a half-duplex transceiver in accordance with various examples.

FIG. 6 shows a method 600 for operating a half-duplex transceiver (e.g., half-duplex transceiver 300 described above). The half-duplex transceiver 300 includes an antenna 202 coupled to antenna-side transformer windings 210. The method 600 begins in block 602 with operating the half-duplex transceiver 300 in a receive mode by coupling a low-noise amplifier (e.g., LNA 222) to the antenna 202 by the antenna-side transformer windings 210. In this way, an inductive signal coupling is provided between the antenna 202 and the LNA 222, which improves performance of the half-duplex transceiver 300 as explained above. The method 600 optionally continues in block 604 with operating the half-duplex transceiver 300 in a transmit mode by de-coupling the low-noise amplifier (e.g., LNA 222) from the antenna-side transformer windings 210. As explained above, a transmit-receive switch 214 may facilitate operation in such transmit and receive modes. For example, during the receive mode, the transmit-receive switch 214 is controlled so as to not conduct, which couples the antenna-side transformer windings 210 to the LNA 222. During the transmit mode, the transmit-receive switch 214 is controlled so as to conduct, which couples a node 215 between the antenna-side transformer windings 210 and the LNA 222 to a ground node, effectively de-coupling the LNA 222 from the antenna-side transformer windings 210.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A transceiver comprising:
   a transformer having a primary winding and a secondary winding, the secondary winding of the transformer having a first inductance;
   a first amplifier having an output coupled to the primary winding of the transformer;
   an antenna coupled to the secondary winding of the transformer without using capacitive coupling, wherein the antenna is coupled to the secondary winding of the transformer via a bond wire having a second inductance that is lower than the first inductance;
   a switch coupled to the secondary winding of the transformer; and
   a second amplifier having:
      an input coupled to the secondary winding of the transformer, and
      a first transistor having a control terminal coupled to the secondary winding of the transformer via an inductor.

2. The transceiver of claim 1, wherein the antenna is inductively coupled to the secondary winding of the transformer.

3. The transceiver of claim 1, further comprising an inductive matching network coupled between the input of the second amplifier and the secondary winding of the transformer.

4. The transceiver of claim 1, wherein the switch is configured to conduct in a transmit mode of the transceiver and to not conduct in a receive mode of the transceiver.

5. The transceiver of claim 1, wherein the second amplifier further comprises a degeneration inductor coupled between a current path of the first transistor and a reference terminal.

6. The transceiver of claim 1, further comprising a bias voltage source coupled to the control terminal of the first transistor.

7. The transceiver of claim 6, further comprising a resistor coupled between the bias voltage source and the control terminal of the first transistor.

8. The transceiver of claim 6, wherein the bias voltage source is coupled to the control terminal of the first transistor and to the secondary winding of the transformer without using capacitive coupling.

9. The transceiver of claim 1, wherein the transformer is a balun transformer.

10. The transceiver of claim 1, wherein the second inductance is at least four times lower than the first inductance.

11. The transceiver of claim 1, wherein the transceiver is a half-duplex transceiver, wherein the first amplifier is a power amplifier, and wherein the second amplifier is a low-noise amplifier.

12. The transceiver of claim 1, A transceiver comprising:
a transformer having a primary winding and a secondary winding, the secondary winding of the transformer having a first inductance;
a first amplifier having an output coupled to the primary winding of the transformer;
an antenna coupled to the secondary winding of the transformer without using capacitive coupling, wherein the antenna is coupled to the secondary winding of the transformer via a bond wire having a second inductance that is lower than the first inductance;
a switch coupled to the secondary winding of the transformer; and
a second amplifier having an input coupled to the secondary winding of the transformer, wherein the secondary winding of the transformer is coupled between the antenna and the switch.

13. The transceiver of claim 12, wherein the second amplifier comprises a first transistor having a control terminal coupled to the secondary winding of the transformer via an inductor.

14. An electronic circuit comprising:
first and second transformer terminals configured to be coupled to a primary winding of a transformer;
third and fourth transformer terminals configured to be coupled to a secondary winding of the transformer;
a first amplifier having an output coupled to the first and second transformer terminals;
an antenna terminal coupled to the third transformer terminal without using capacitive coupling;
a switch coupled between the fourth transformer terminal and a reference terminal;
a second amplifier having an input coupled to the fourth transformer terminal; and
a bias voltage source having an output coupled to the input of the second amplifier and to the fourth transformer terminal without using capacitive coupling.

15. The electronic circuit of claim 14, wherein the antennal terminal is inductively coupled to the third transformer terminal.

16. The electronic circuit of claim 15, wherein the antennal terminal is inductively coupled to the third transformer terminal via a bond wire.

17. The electronic circuit of claim 14, further comprising an inductive matching network coupled between the input of the second amplifier and the fourth transformer terminal.

18. The electronic circuit of claim 14, wherein the switch is configured to conduct in a transmit mode of the electronic circuit and to not conduct in a receive mode of the electronic circuit.

19. The electronic circuit of claim 14, wherein the second amplifier comprises a first transistor having a control terminal coupled to the fourth transformer terminal via an inductor.

20. The electronic circuit of claim 19, wherein the second amplifier further comprises a degeneration inductor coupled between a current path of the first transistor and the reference terminal.

21. The electronic circuit of claim 19, further comprising a resistor coupled between the output of the bias voltage source and the control terminal of the first transistor.

22. A method comprising:
receiving an enable signal by a control terminal of a switch of a transceiver, the switch coupled between a secondary winding of a transformer and ground, the secondary winding of the transformer being coupled to an antenna without using capacitive coupling and via a bond wire having a first inductance that is at least four times lower than a second inductance of the secondary winding of the transformer, wherein the secondary winding of the transformer is further coupled to an input of a first amplifier, and wherein the transformer comprises a primary winding coupled to an output of a second amplifier;
providing a bias voltage to an intermediate node that is coupled to the input of the first amplifier and to the secondary winding of the transformer without capacitive coupling;
during a receive mode of the transceiver, deasserting the enable signal to couple the input of the first amplifier to the antenna via the secondary winding of the transformer; and
during a transmit mode of the transceiver, asserting the enable signal to decouple the input of the first amplifier from the antenna.

23. The method of claim 22, wherein providing the bias voltage to the intermediate node comprises providing the bias voltage to the intermediate node via a resistor.

* * * * *